(12) United States Patent
Sun

(10) Patent No.: US 7,070,550 B1
(45) Date of Patent: Jul. 4, 2006

(54) TRANSMISSION MECHANISM FOR TOOL CHANGING DEVICE

(76) Inventor: Ying Sun, No. 20, Alley 28, Lane 851, Chung Shan Road, Shen Kang Hsiang, Taichung Hsien (TW) 429

( * ) Notice: Subject to any disclaimer, the term of this patent is extended or adjusted under 35 U.S.C. 154(b) by 16 days.

(21) Appl. No.: 11/014,873

(22) Filed: Dec. 20, 2004

(51) Int. Cl.
*B23Q 3/157* (2006.01)

(52) U.S. Cl. .............................. 483/39; 483/44; 74/567

(58) Field of Classification Search ............ 483/38–39, 483/44, 62, 66–67; 74/53–55, 567
See application file for complete search history.

(56) References Cited

U.S. PATENT DOCUMENTS

| | | | | |
|---|---|---|---|---|
| 4,833,772 A | * | 5/1989 | Kobayashi et al. ............ 483/44 |
| 5,424,621 A | * | 6/1995 | Hwang et al. ................. 483/44 |
| 5,928,120 A | * | 7/1999 | Kameyama ................... 483/38 |
| 5,947,878 A | * | 9/1999 | Hwang et al. ................. 483/44 |
| 6,090,026 A | * | 7/2000 | Hosokawa et al. ........... 483/39 |
| 6,422,099 B1 | * | 7/2002 | Sun .............................. 74/567 |
| 6,601,470 B1 | * | 8/2003 | Kato ............................ 74/567 |
| 6,637,290 B1 | * | 10/2003 | Kato ............................ 74/569 |

FOREIGN PATENT DOCUMENTS

JP 62-4544 A * 1/1987

* cited by examiner

*Primary Examiner*—Erica Cadugan
(74) *Attorney, Agent, or Firm*—Bacon & Thomas

(57) ABSTRACT

A tool changing device includes a conjugate cam composed of two plate cams and the conjugate cam is mounted to the cam axle. The two plate cams are operatively engaged with two rollers on two sides of a gear so that the gear is periodically rotated to drive the tool shaft which is rotated and precisely positioned to change the tools as expected.

5 Claims, 11 Drawing Sheets

TRANSMISSION MECHANISM FOR TOOL CHANGING DEVICE

FIELD OF THE INVENTION

The present invention relates to a transmission device for a tool changing device and employs a conjugate cam and a roller on a gear so as to transfer the power periodically to the tool shaft.

BACKGROUND OF THE INVENTION

A conventional machine center such as CNC machinery includes a tool automatic changer located between the main shaft and the tool cabinet which received multiple tools for being picked up by the tool arm. The tool changer 10 as shown in FIG. 1 includes a motor 12 connected to the body 11 of the machine so as to drive a small befell gear 121 which drives a large bevel gear 13 and a cam 131 on the large bevel gear 13. The cam 131 is cooperated with a bearing 141 to drive a tube 14 which is connected to a sleeve 151 of a tool shaft 15 so that the tool shaft 15 can be indirectly driven. The large bevel gear 13 has a cam 132 which activates a swing arm 16 so as to move the tool shaft 15 axially in the tube 14. A sprocket 133 is connected to a side of an axle 17 of the large bevel gear 13 and a chain 134 is connected between the sprocket 133 and another sprocket 135 to rotate a signal wheel 18. A plurality of inducing members 19 are connected a frame 136 as shown in FIG. 2 so as to detect the angular positions and angles of the signal wheel 18 so as to control the rotation angle of the tool shaft 15. By controlling the angles and the travel of the tool shaft 15, the tool arm 152 at the lower end of the tool shaft 15 may catch or release the tools by two catch ends of the tool arm 152.

However, the power of the motor 12 is transferred to the tool shaft 15 via the cam 132, the bearing 141, and the sleeve 151 is low in efficiency and the sleeve 151 is difficult to be manufactured precisely as desired. Once the sleeve 151 is worn out, it has to be replaced with a new one. The cam 131 requires higher standard of machining to obtain the desired precision and this is costly. Furthermore, the transmission efficiency by the small and large bevel gears 121, 13 and the cam 131 is low. The signal wheel 18 is rotated by the motor 12 via the small bevel gear 121, the large bevel gear 13, the cam 131, the sprockets 133, 135 and the chain 134. Especially for the signal wheel 18, it requires a mechanism outside of the body 11 to install the signal wheel 18, such as a pivot shaft 181, a seal 182 and a cap 183 on the body 11. The whole mechanism is bulky and complicated. The manufacturing cost for the cam 131 is high and chain 134 needs to be adjusted manually and affects the precision of the signal wheel 18. The signal area 184 of the signal wheel 18 may not be matched with the inducing members 19 such that the tool shaft 15 cannot be precisely positioned. Besides, in order to smoothly operate the bevel gears 121, 13, lubrication oil is filled in the body 11. When moving the body 11, the lubrication oil could leak if the body 11 is put in a wrong orientation.

SUMMARY OF THE INVENTION

The present invention relates to a tool changing device which comprises a body with a motor connected to an outside of the body and a cam axle is received in the body and driven by the motor. A conjugate cam having two plate cams is mounted on the cam axle. A gear is connected to the body and two rollers are located on two sides of the gear. The two rollers are operatively engaged with the two plate cams so as to drive the gear periodically. A tool shaft is pivotably connected in the body and an end of the tool shaft extends through the body. Two catch ends are defined in two ends of the end of the tool shaft. A threaded portion is defined in the tool shaft and engaged with the gear so that the tool shaft is driven by the gear to move an to catch different tools.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
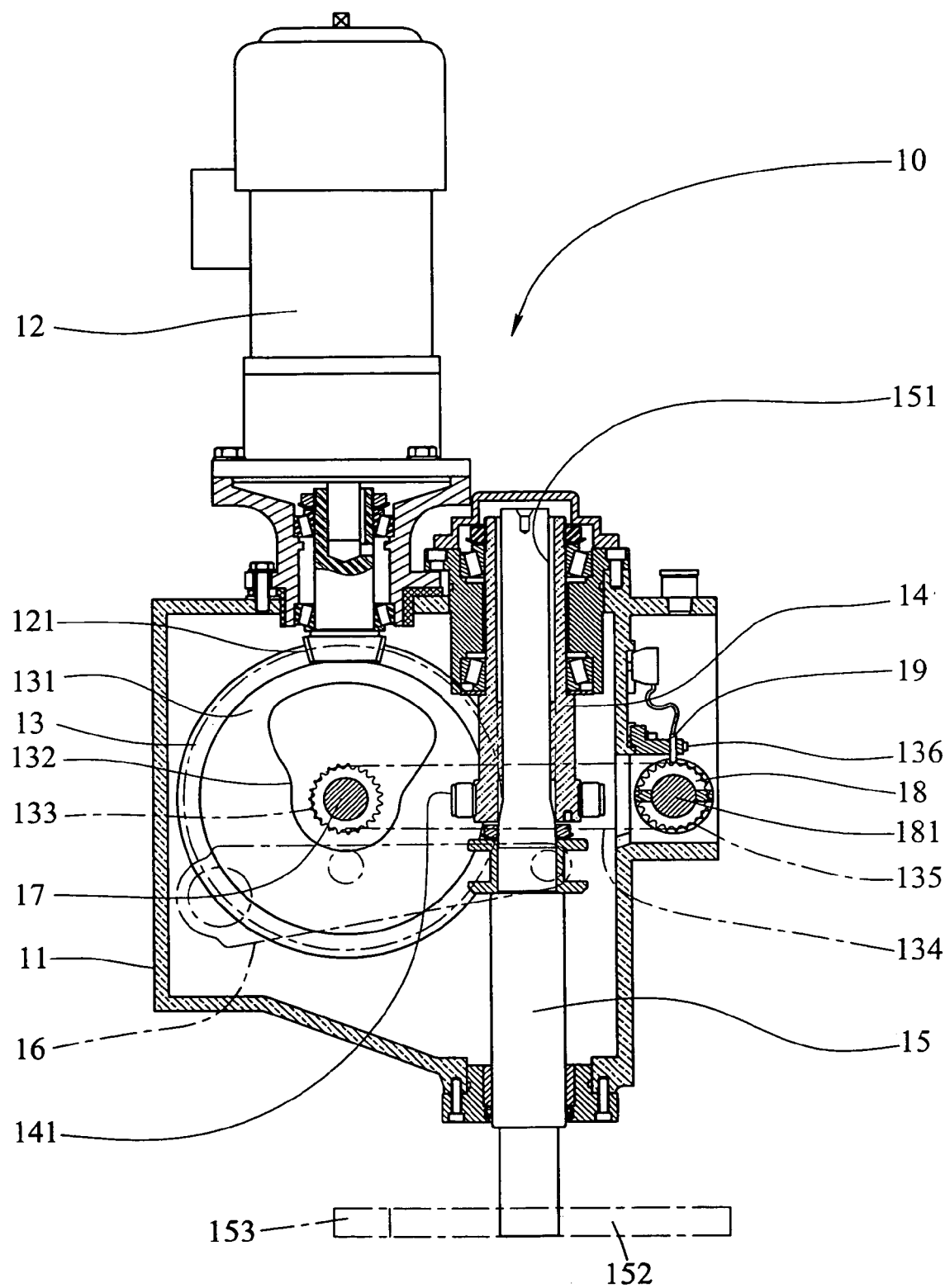
FIG. 1 shows a conventional tool changing device.
Figure 2:
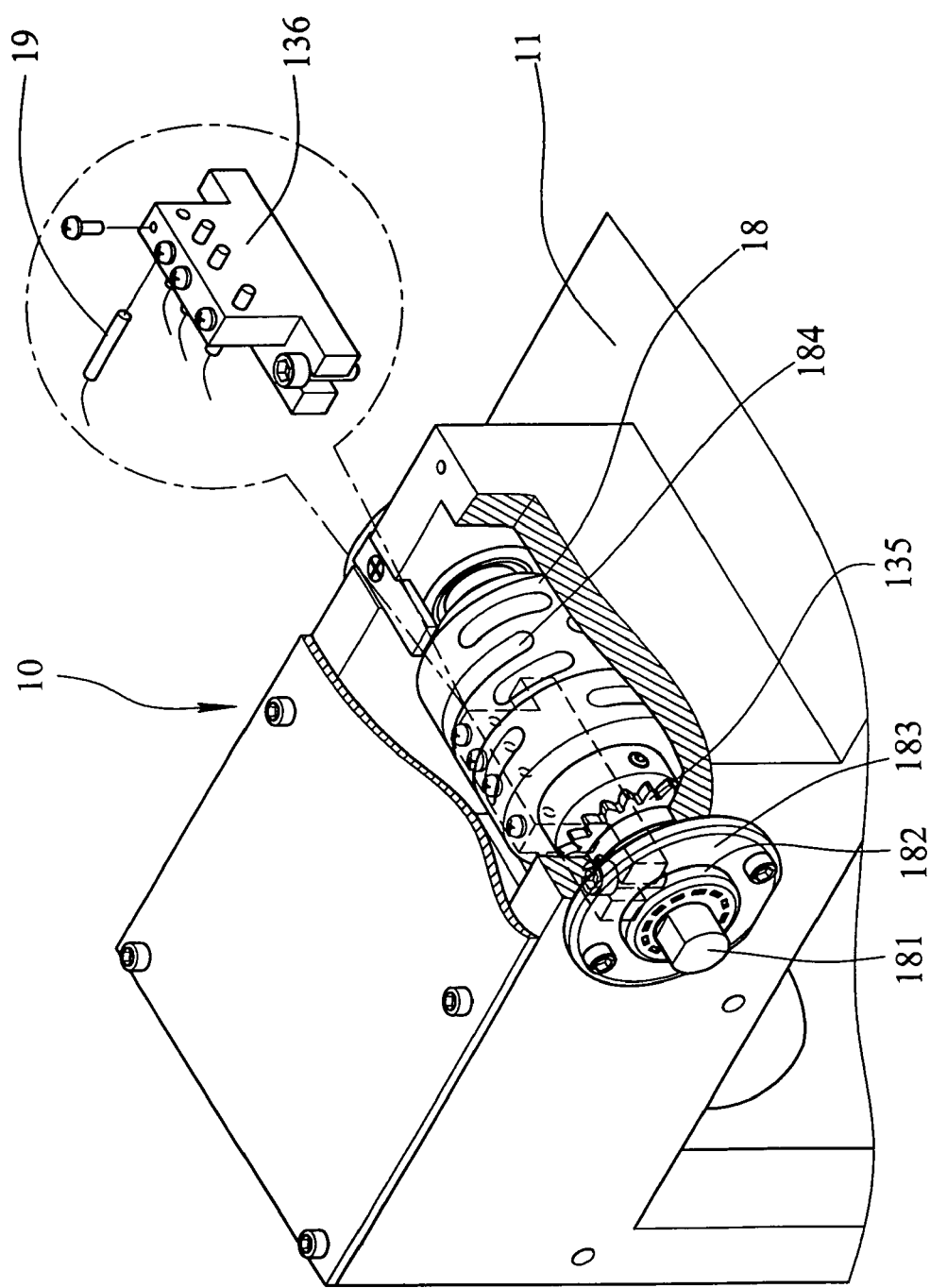
FIG. 2 shows the signal wheel of the conventional tool changing device.
Figure 3:
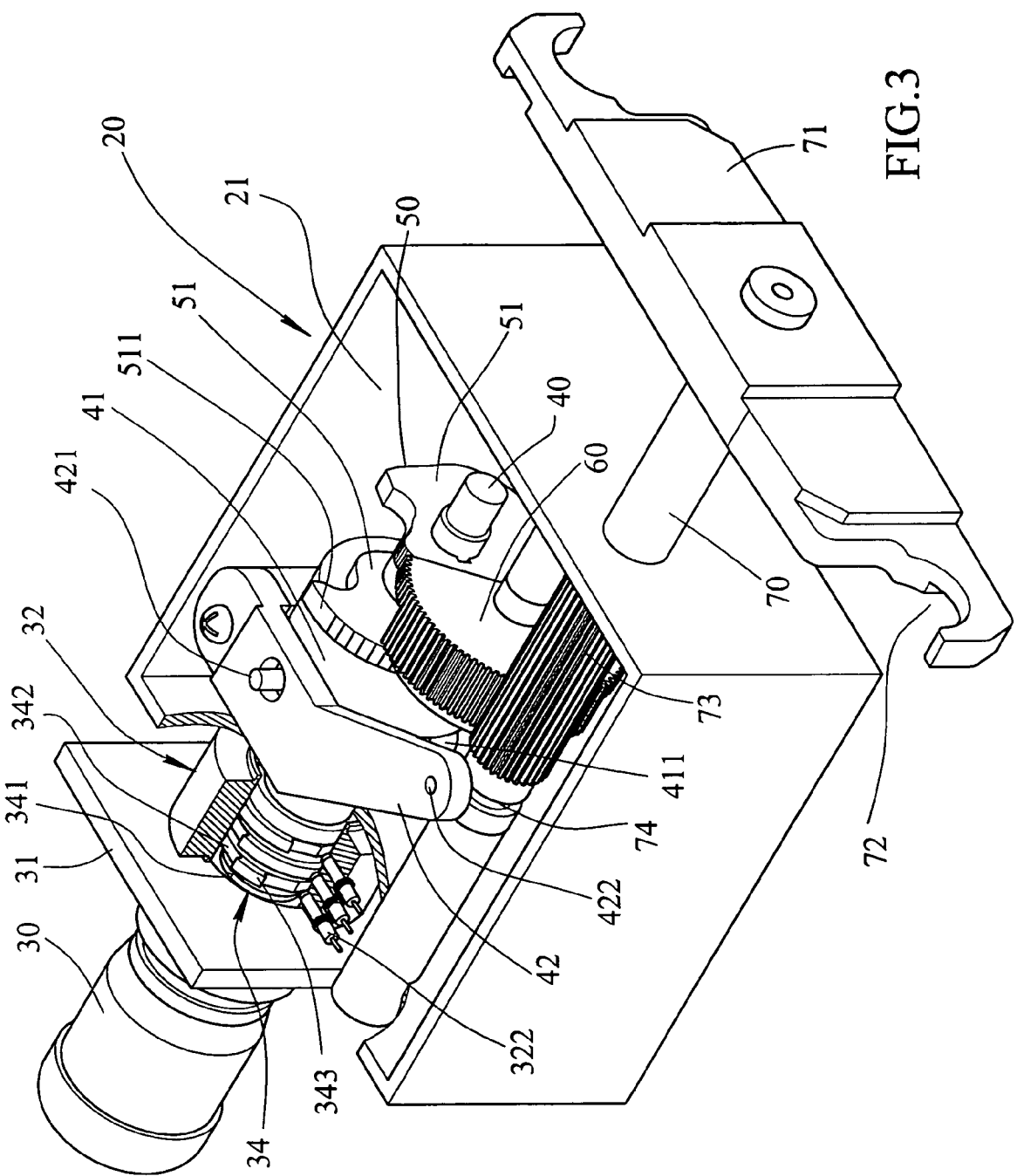
FIG. 3 shows the tool changing device of the present invention.
Figure 4:
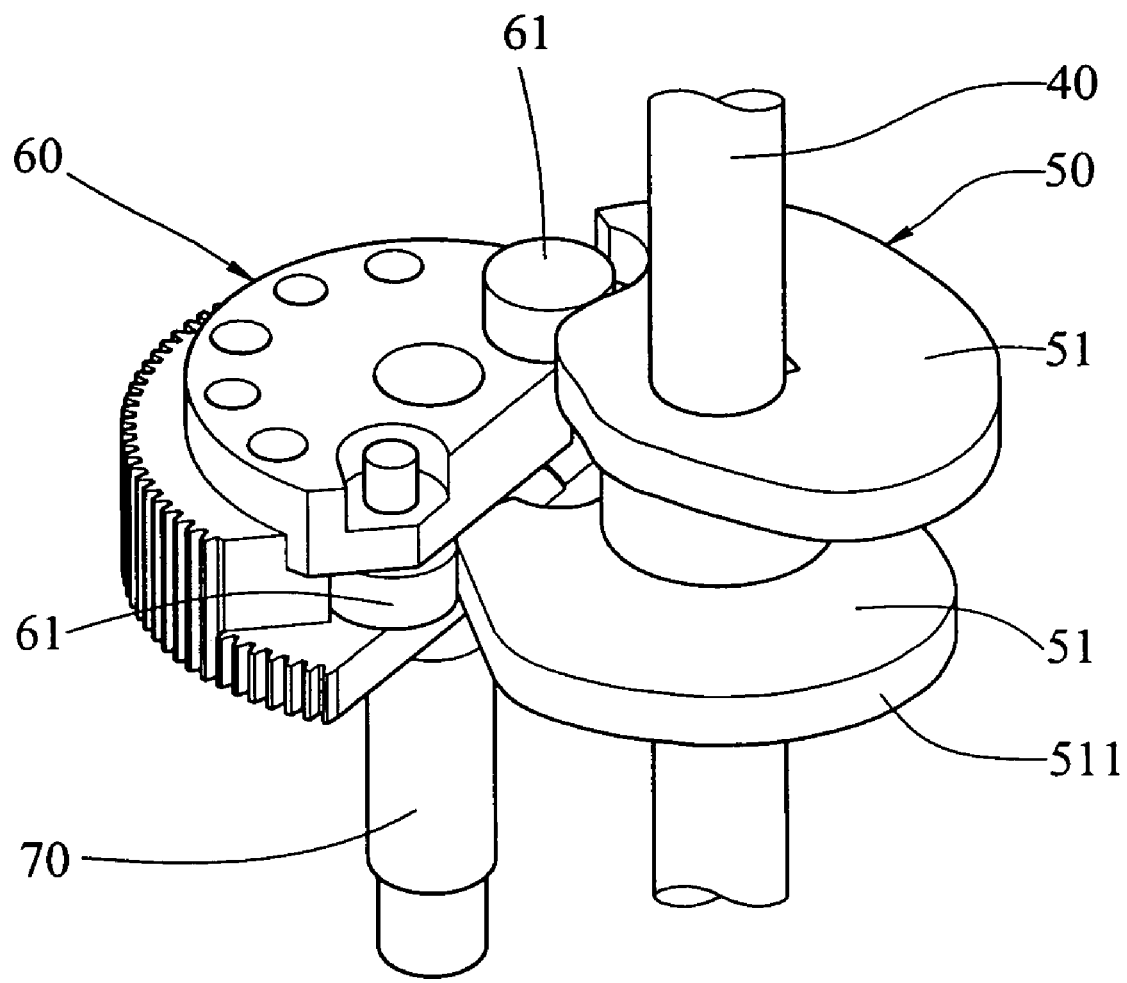
FIG. 4 shows that the conjugate cam is engaged with the rollers on two sides of the gear.
Figure 5:
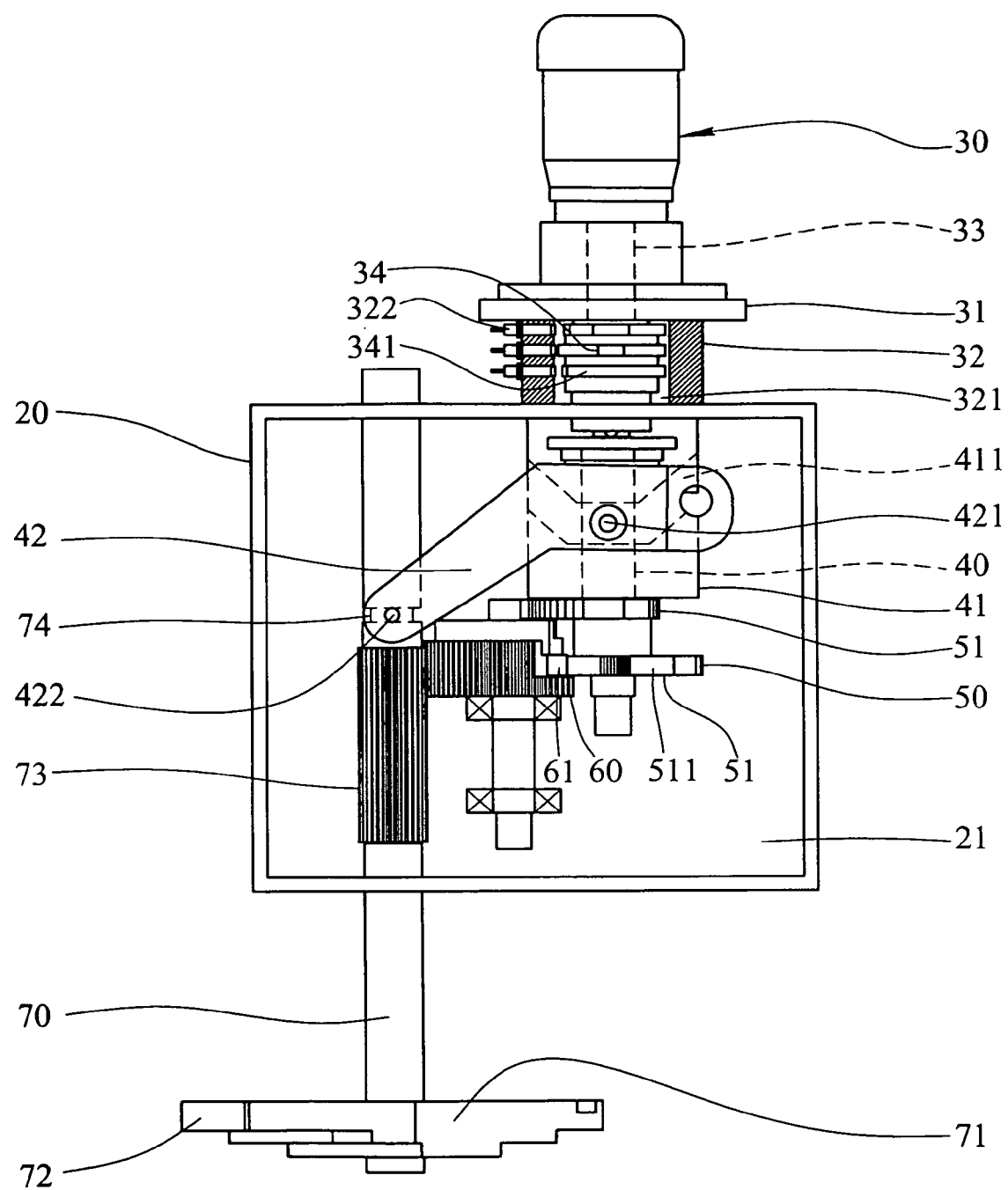
FIG. 5 shows a side cross sectional view of the tool changing device of the present invention.

Referring to FIGS. 3 to 5, the tool changing device of the present invention comprises a body 20 with a motor 30 connected to an outside of the body 20 by a fixing frame 31, a cam axle 40 received in an interior 21 of the body 20 and driven by the motor 30, a conjugate cam 50, a gear 60 and a tool shaft 70.

An inducing frame 32 is connected between the body 20 and the fixing frame 31. A plurality of inducing members 322 are radially connected to an inside 321 of the inducing frame 32. The motor 30 has an output shaft 33 which is connected to a signal coupler 34 which includes a plurality of inducing areas 341 on an outer periphery thereof. The inducing areas 341 are in a form of alternative arrangement of recesses 342 and protrusions 343, the inducing areas 341 are located corresponding to the inducing members 322.

The cam axle 40 has one end connected to the body 20 and the other end of the cam axle is connected to the signal coupler 34. A cam 41 is mounted to a middle of the cam axle 40 and includes a V-shaped guide slot 411 so that a bearing 421 on a middle portion of a swing arm 42 is engaged with the V-shaped guide slot 411. The swing arm 42 has one end pivotably connected to the body 20 and the other end of the swing arm 42 is connected with a bearing 422.

The conjugate cam 50 has two parallel plate cams 51 and a hole 52 is defined through the conjugate cam 50 so as to be mounted on the cam axle 40.

The gear 60 is connected to the body 20 and two rollers 61 located on two sides of the gear 60. The two rollers 61 are operatively engaged with the two plate cams 51 so as to drive the gear 60 periodically.

The tool shaft 70 is pivotably connected in the body 20 and an end of the tool shaft 70 extends through the body 20 and has two catch ends 72 defined in two ends of the end of the tool shaft 70. A section of the tool shaft 70 in the body 20 includes a threaded portion 73 which is engaged with the gear 60 so that the tool shaft 70 is driven by the gear 60. An annular groove 74 is defined along the outer periphery of the tool shaft 70 and located above the threaded portion 73 so that the bearing 422 of the swing arm 42 is engaged with the annular groove 74. The tool shaft 70 is moved up and down by the swing arm 42.

Figure 6A:
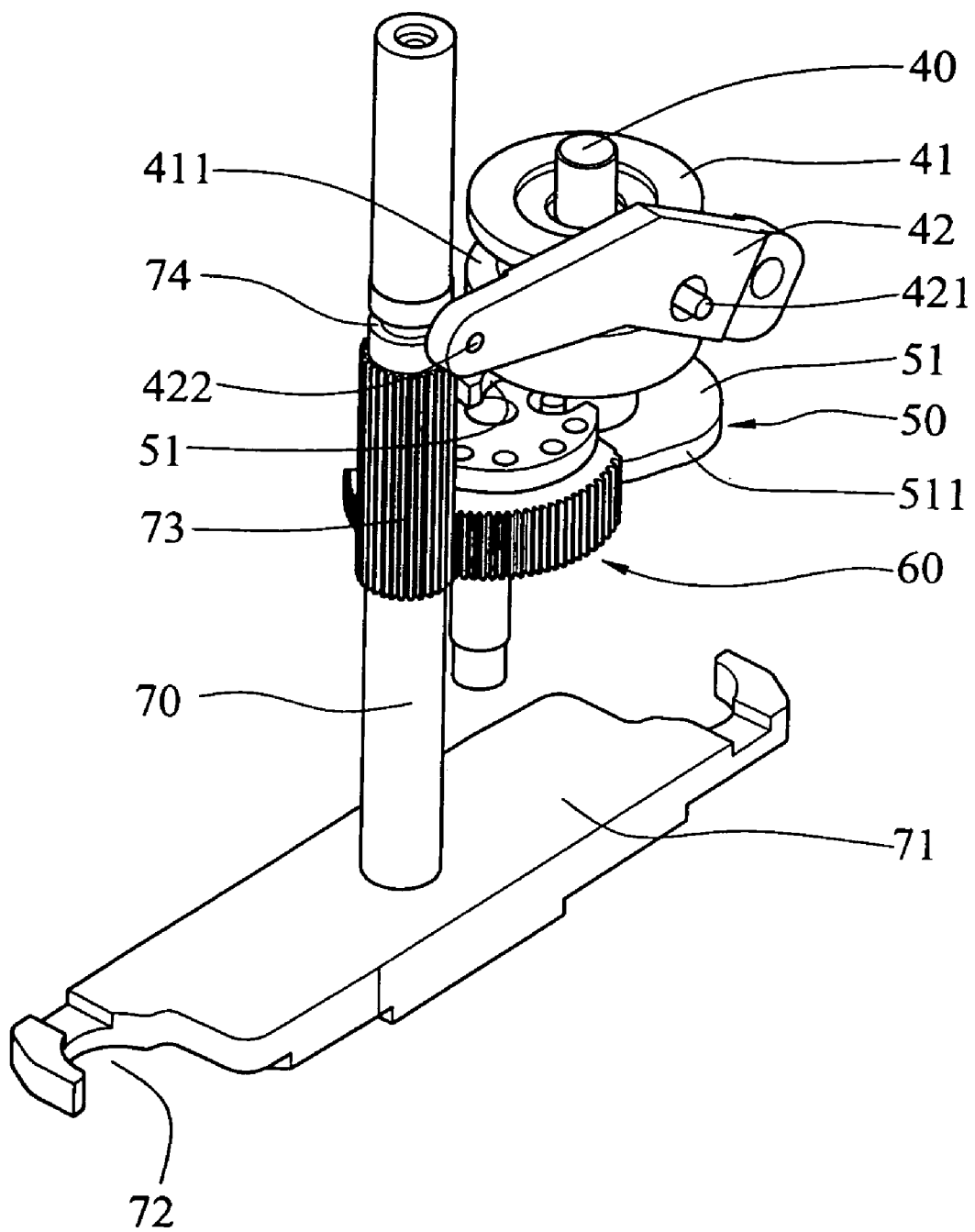
FIGS. 6A to 6F show the action of change of tools.
Figure 6B:
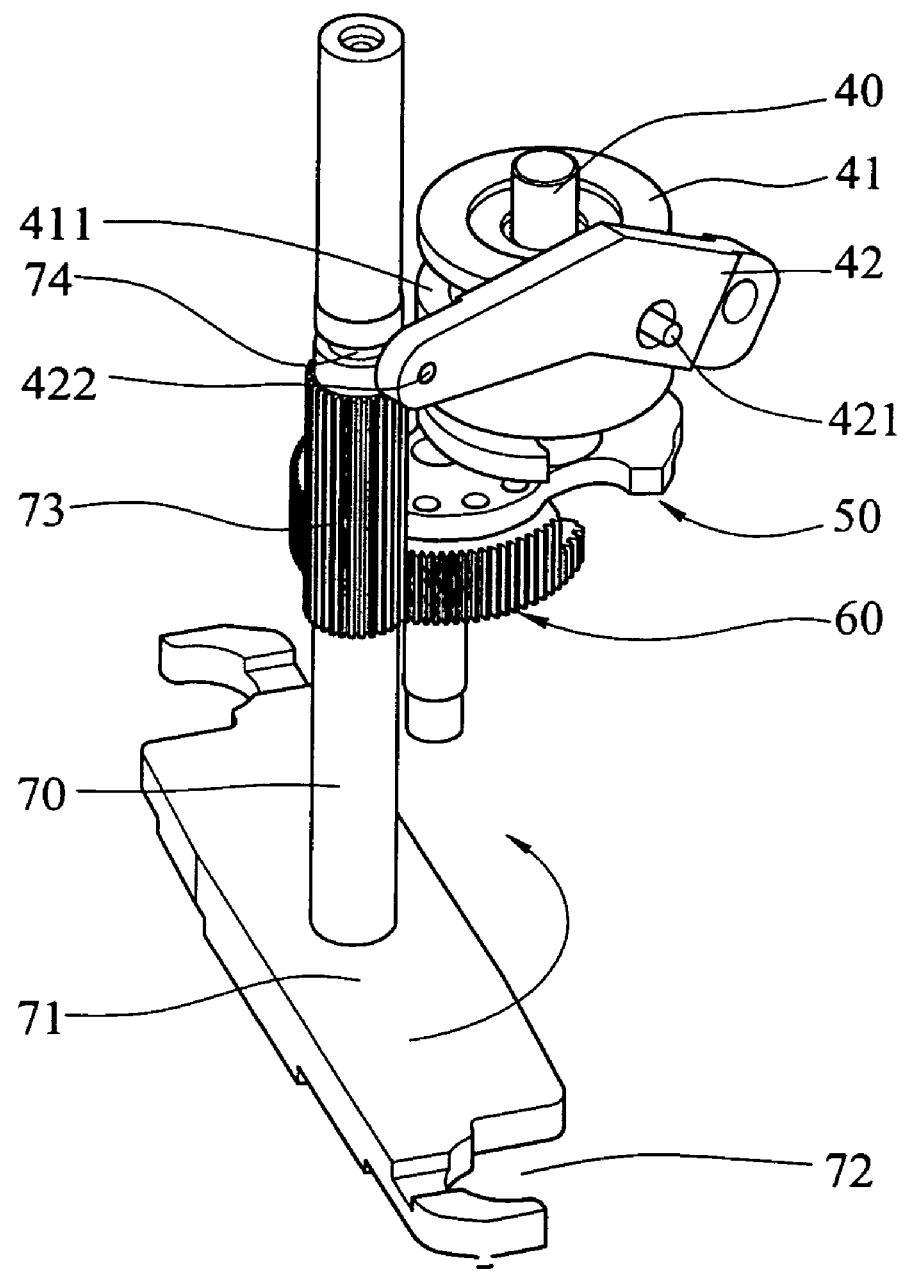

As shown in FIGS. 6A and 6B, when the motor 30 is activated, the can axle 40 and the conjugate cam 50 are co-rotated by the signal coupler 34 and the two plate cams 51 drives the rollers 61 of the gear 60 to drive the gear 60. With the engagement of the gear 60 and the threaded portion 73 of the tool shaft 70, the tool shaft 70 is rotated 90 degrees in a pre-decided direction such that the two catch ends 72 of the tool arm 71 respectively release and catch tools from the tool box.

Figure 6C:
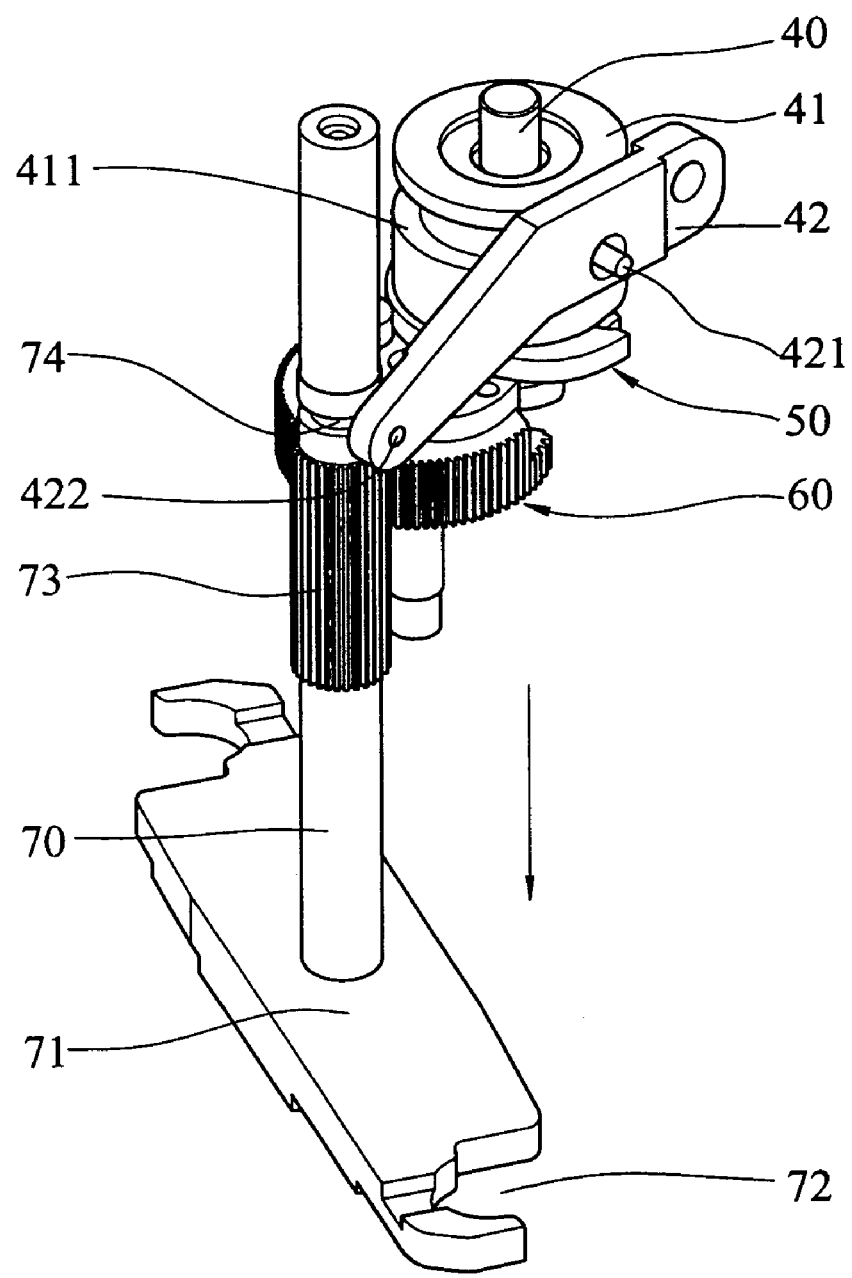

As shown in FIG. 6C, the conjugate cam 50 is rotated and does not drive the gear 60 so that the gear 60 and the tool shaft 70 are periodically stopped. The cam 41 drives the swing arm 42 downward to lower the tool shaft 70 to complete the catch action of the tools.

Figure 6D:
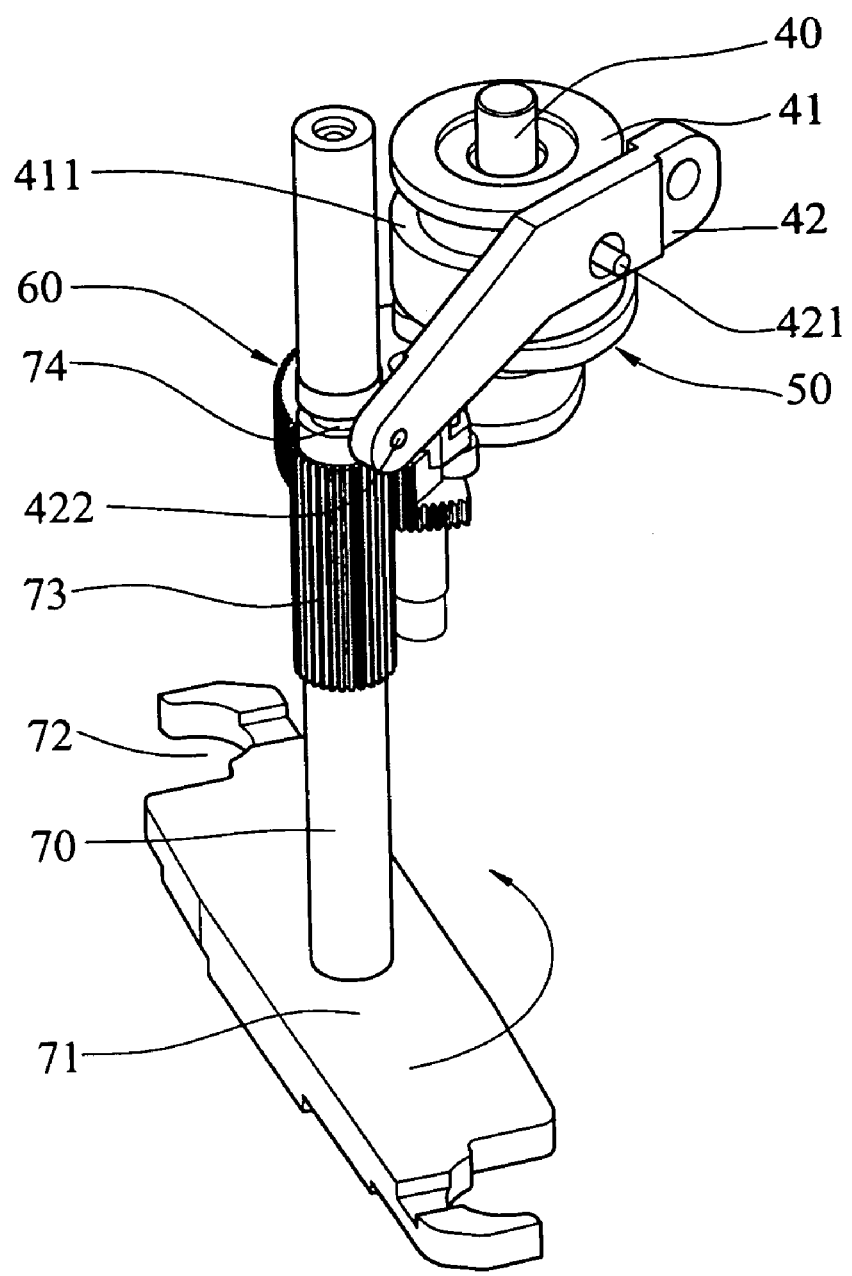

As shown in FIG. 6D, the gear 60 is then rotated by the conjugate cam 50 and drives the tool shaft 70 180 degrees to complete the catch action of the tools. In this status, the cam 41 stops to activate the swing arm 42.

Figure 6E:
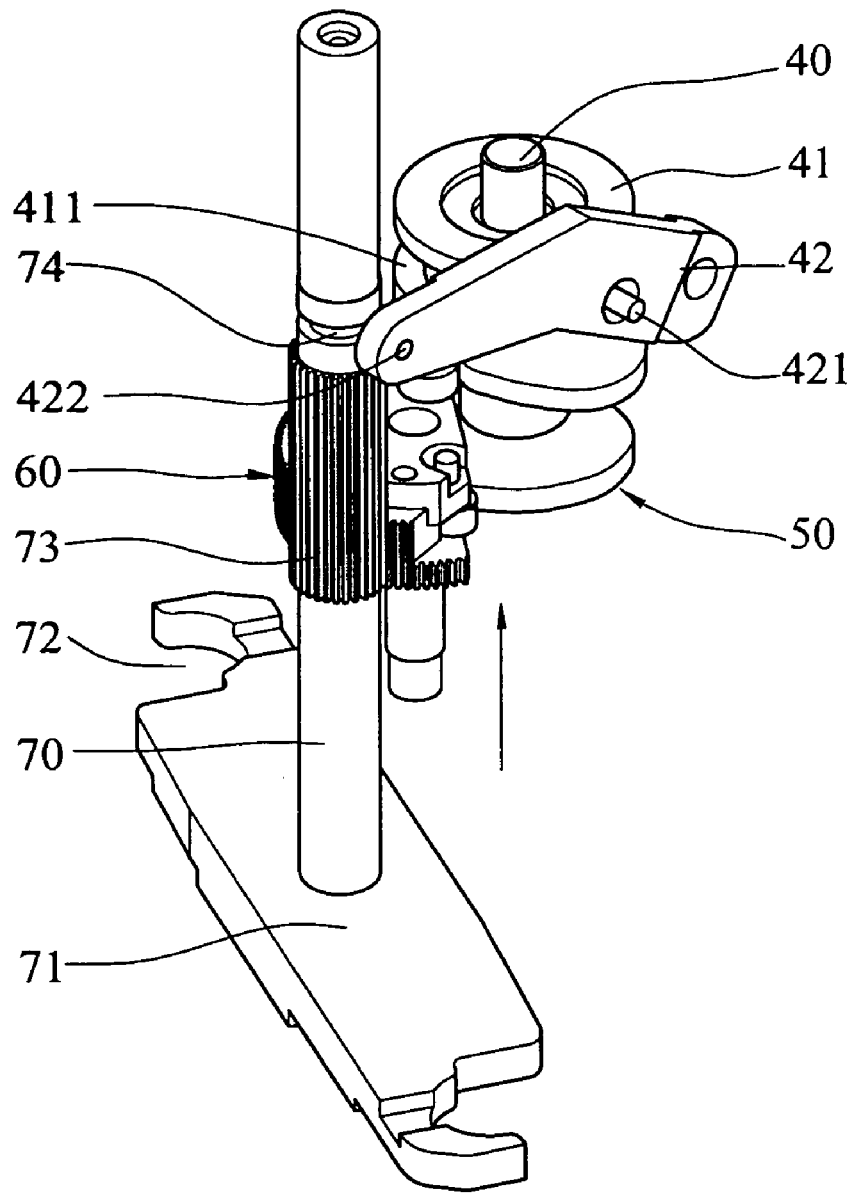

As shown in FIG. 6E, again, the gear 60 stops and the cam 41 swings the swinging arm 42 upward to lift the tool shaft 70 to install the tools to the chuck an the tool box respectively.

Figure 6F:
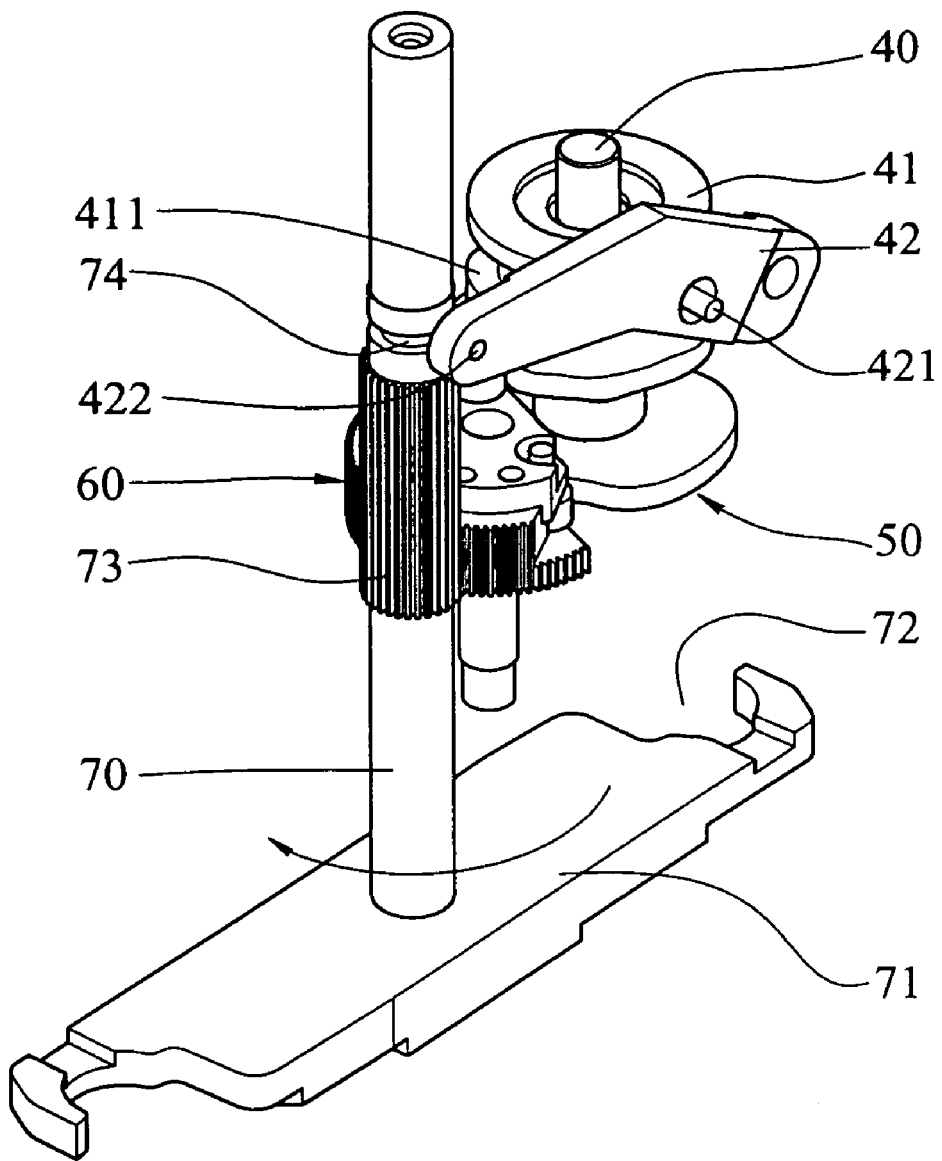

As shown in FIG. 6F, the gear 60 is driven by the conjugate cam 50 backward and drives the tool shaft 70 for 90 degrees so as to re-position the catch ends 72 of the tool arm 71 and ready for next movement.

The invention provides the conjugate cam 50 and the gear 60, both of which are easily to be manufactured. The efficiency of transferring power is higher by the engagement of the conjugate cam 50 and the gear 60. Besides, due to the high efficiency of the transmission, there is no need to fill lubrication oil in the body 20 s that there is no limitation of orientation to install the body 20 and tool shaft 70 can be installed in many directions.

While we have shown and described the embodiment in accordance with the present invention, it should be clear to those skilled in the art that further embodiments may be made without departing from the scope of the present invention.

What is claimed is:

1. A tool changing device comprising:
   a body with a motor connected to an outside of the body, a cam axle received in the body and driven by the motor;
   a conjugate cam having two plate cams on the cam axle;
   an externally-toothed gear connected to the body and two rollers located on two sides of the gear, the two rollers operatively engaged with the two plate cams so as to drive the gear periodically, and
   a tool shaft pivotably connected in the body and an end of the tool shaft extending through the body, two catch ends defined in two ends of the end of the tool shaft, the tool shaft in the body having a threaded portion which is engaged with the gear so that the tool shaft is driven by the gear.

2. The mechanism as claimed in claim 1, wherein the motor has an output shaft and a signal coupler is connected to the output shaft, the signal coupler drives the cam axle and has a plurality of inducing areas.

3. The device as claimed in claim 2, wherein the motor has a fixing frame which is connected to the body by an inducing frame, the signal coupler received in an inside of the inducing frame, a plurality of inducing members connected to the inducing frame and being induced with the inducing areas of the signal coupler so as to control the motor.

4. The device as claimed in claim 2, wherein inducing areas are protrusions and recesses which is located alternatively to the protrusions.

5. The device as claimed in claim 1, wherein a cam is mounted to the cam axle and a V-shaped guide groove is defined in an outer periphery of the cam, a middle portion of a swing arm engaged with the V-shaped guide groove so that the cam drives the swing arm to drive the tool shaft.

\* \* \* \* \*